United States Patent
Nishi et al.

(10) Patent No.: US 6,792,176 B2
(45) Date of Patent: Sep. 14, 2004

(54) OPTICAL SWITCH EXPANDING METHOD, OPTICAL SWITCH, AND OPTICAL CROSSCONNECTING APPARATUS

(75) Inventors: Tetsuya Nishi, Kawasaki (JP); Satoshi Kuroyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 200 days.

(21) Appl. No.: 09/835,374

(22) Filed: Apr. 17, 2001

(65) Prior Publication Data

US 2002/0044718 A1 Apr. 18, 2002

(30) Foreign Application Priority Data

Oct. 13, 2000  (JP) ........................................ 2000-313971

(51) Int. Cl.[7] .............................................. G02B 6/26
(52) U.S. Cl. ............................. 385/17; 385/16; 385/18; 385/19; 385/24; 385/31
(58) Field of Search ............................. 385/17, 16, 19, 385/18, 24, 31

(56) References Cited

U.S. PATENT DOCUMENTS

| | | | | |
|---|---|---|---|---|
| 4,852,958 A | * | 8/1989 | Okuyama et al. | ............. 385/17 |
| 6,317,529 B1 | * | 11/2001 | Kashima | ..................... 385/16 |
| 6,347,168 B1 | * | 2/2002 | Shimomura et al. | .......... 385/19 |

FOREIGN PATENT DOCUMENTS

EP    1 014 625    6/2000

OTHER PUBLICATIONS

Patent Abstracts of Japan of JP 5–130038 dated May 25, 1993.

* cited by examiner

Primary Examiner—Robert H. Kim
Assistant Examiner—George Y. Wang
(74) Attorney, Agent, or Firm—Staas & Halsey LLP

(57) ABSTRACT

An optical switch has first to fourth optical matrix switches in each of which a plurality of 2-input/2-output optical switch elements are arranged in a matrix to form a plurality of input ports, a plurality of auxiliary input ports, a plurality of output ports, and a plurality of auxiliary output ports. The auxiliary output ports in the first optical matrix switch are connected to the respective input ports in the third optical matrix switch, the output ports in the second optical matrix switch are connected to the respective auxiliary input ports in the third optical matrix switch, the output ports in the first optical matrix switch are connected to the respective auxiliary input ports in the fourth optical matrix switch, and the auxiliary output ports in the second optical matrix switch are connected to the respective input ports in the fourth optical matrix switch.

13 Claims, 13 Drawing Sheets

FIG.3

| Row Number of Optical Switch Element | Column Number of Optical Switch Element | | | | | | | |
|---|---|---|---|---|---|---|---|---|
| | 1 | 2 | 3 | 4 | 5 | 6 | 7 | 8 |
| 1 | S15 | S16 | S17 | S18 | S11 | S12 | S13 | S14 |
| 2 | S25 | S26 | S27 | S28 | S21 | S22 | S23 | S24 |
| 3 | S35 | S36 | S37 | S38 | S31 | S32 | S33 | S34 |
| 4 | S45 | S46 | S47 | S48 | S41 | S42 | S43 | S44 |
| 5 | S51 | S52 | S53 | S54 | S55 | S56 | S57 | S58 |
| 6 | S61 | S62 | S63 | S64 | S65 | S66 | S67 | S68 |
| 7 | S71 | S72 | S73 | S74 | S75 | S76 | S77 | S78 |
| 8 | S81 | S82 | S83 | S84 | S85 | S86 | S87 | S88 |

FIG.5

| Row Number of Optical Switch Element | Column Number of Optical Switch Element | | | | | | | |
|---|---|---|---|---|---|---|---|---|
| | 1 | 2 | 3 | 4 | 5 | 6 | 7 | 8 |
| 1 | S15 | S25 | S27 | S48 | S43 | S23 | S21 | S11 |
| 2 | S26 | S17 | S45 | S28 | S24 | S41 | S13 | S22 |
| 3 | S37 | S46 | S18 | S35 | S31 | S14 | S42 | S33 |
| 4 | S48 | S38 | S36 | S16 | S12 | S32 | S34 | S44 |
| 5 | S51 | S61 | S63 | S83 | S87 | S67 | S65 | S55 |
| 6 | S62 | S53 | S81 | S64 | S68 | S85 | S57 | S66 |
| 7 | S73 | S82 | S54 | S71 | S75 | S58 | S86 | S77 |
| 8 | S84 | S74 | S72 | S52 | S56 | S76 | S78 | S88 |

FIG. 11

| | Column Number of Optical Switch Element | | | | | | | | | | | | | | | |
|---|---|---|---|---|---|---|---|---|---|---|---|---|---|---|---|---|
| Row Number of Optical Switch Element | 01 | 02 | 03 | 04 | 05 | 06 | 07 | 08 | 09 | 10 | 11 | 12 | 13 | 14 | 15 | 16 |
| 01 | S0109 | S0110 | S0111 | S0112 | S0113 | S0114 | S0115 | S0116 | S0105 | S0106 | S0107 | S0108 | S0101 | S0102 | S0103 | S0104 |
| 02 | S0209 | S0210 | S0211 | S0212 | S0213 | S0214 | S0215 | S0216 | S0205 | S0206 | S0207 | S0208 | S0201 | S0202 | S0203 | S0204 |
| 03 | S0309 | S0310 | S0311 | S0312 | S0313 | S0314 | S0315 | S0316 | S0305 | S0306 | S0307 | S0308 | S0301 | S0302 | S0303 | S0304 |
| 04 | S0409 | S0410 | S0411 | S0412 | S0413 | S0414 | S0415 | S0416 | S0405 | S0406 | S0407 | S0408 | S0401 | S0402 | S0403 | S0404 |
| 05 | S0513 | S0514 | S0515 | S0516 | S0509 | S0510 | S0511 | S0512 | S0501 | S0502 | S0503 | S0504 | S0505 | S0506 | S0507 | S0508 |
| 06 | S0613 | S0614 | S0615 | S0616 | S0609 | S0610 | S0611 | S0612 | S0601 | S0602 | S0603 | S0604 | S0605 | S0606 | S0607 | S0608 |
| 07 | S0713 | S0714 | S0715 | S0716 | S0709 | S0710 | S0711 | S0712 | S0701 | S0702 | S0703 | S0704 | S0705 | S0706 | S0707 | S0708 |
| 08 | S0813 | S0814 | S0815 | S0816 | S0809 | S0810 | S0811 | S0812 | S0801 | S0802 | S0803 | S0804 | S0805 | S0806 | S0807 | S0808 |
| 09 | S0901 | S0902 | S0903 | S0904 | S0905 | S0906 | S0907 | S0908 | S0913 | S0914 | S0915 | S0916 | S0909 | S0910 | S0911 | S0912 |
| 10 | S1001 | S1002 | S1003 | S1004 | S1005 | S1006 | S1007 | S1008 | S1013 | S1014 | S1015 | S1016 | S1009 | S1010 | S1011 | S1012 |
| 11 | S1101 | S1102 | S1103 | S1104 | S1105 | S1106 | S1107 | S1108 | S1113 | S1114 | S1115 | S1116 | S1109 | S1110 | S1111 | S1112 |
| 12 | S1201 | S1202 | S1203 | S1204 | S1205 | S1206 | S1207 | S1208 | S1213 | S1214 | S1215 | S1216 | S1209 | S1210 | S1211 | S1212 |
| 13 | S1305 | S1306 | S1307 | S1308 | S1301 | S1302 | S1303 | S1304 | S1309 | S1310 | S1311 | S1312 | S1313 | S1314 | S1315 | S1316 |
| 14 | S1405 | S1406 | S1407 | S1408 | S1401 | S1402 | S1403 | S1404 | S1409 | S1410 | S1411 | S1412 | S1413 | S1414 | S1415 | S1416 |
| 15 | S1505 | S1506 | S1507 | S1508 | S1501 | S1502 | S1503 | S1504 | S1509 | S1510 | S1511 | S1512 | S1513 | S1514 | S1515 | S1516 |
| 16 | S1605 | S1606 | S1607 | S1608 | S1601 | S1602 | S1603 | S1604 | S1609 | S1610 | S1611 | S1612 | S1613 | S1614 | S1615 | S1616 |

FIG. 12

| Row Number of Optical Switch Element | Column Number of Optical Switch Element | | | | | | | | | | | | | | | |
|---|---|---|---|---|---|---|---|---|---|---|---|---|---|---|---|---|
| | 01 | 02 | 03 | 04 | 05 | 06 | 07 | 08 | 09 | 10 | 11 | 12 | 13 | 14 | 15 | 16 |
| 01 | S0109 | S0209 | S0211 | S0411 | S0415 | S0215 | S0213 | S0113 | S0105 | S0205 | S0207 | S0407 | S0403 | S0203 | S0201 | S0101 |
| 02 | S0210 | S0111 | S0409 | S0212 | S0216 | S0413 | S0115 | S0214 | S0206 | S0107 | S0405 | S0208 | S0204 | S0401 | S0103 | S0202 |
| 03 | S0311 | S0410 | S0112 | S0309 | S0313 | S0116 | S0414 | S0315 | S0307 | S0406 | S0108 | S0305 | S0301 | S0104 | S0402 | S0303 |
| 04 | S0412 | S0312 | S0310 | S0110 | S0114 | S0314 | S0316 | S0416 | S0408 | S0308 | S0306 | S0106 | S0102 | S0302 | S0304 | S0404 |
| 05 | S0513 | S0613 | S0815 | S0815 | S0811 | S0611 | S0609 | S0509 | S0501 | S0601 | S0603 | S0803 | S0807 | S0607 | S0605 | S0505 |
| 06 | S0614 | S0515 | S0813 | S0616 | S0612 | S0809 | S0511 | S0610 | S0206 | S0503 | S0801 | S0604 | S0608 | S0805 | S0507 | S0606 |
| 07 | S0715 | S0814 | S0516 | S0713 | S0709 | S0512 | S0810 | S0711 | S0703 | S0802 | S0504 | S0701 | S0705 | S0508 | S0806 | S0707 |
| 08 | S0816 | S0716 | S0714 | S0514 | S0510 | S0710 | S0712 | S0812 | S0804 | S0704 | S0702 | S0502 | S0506 | S0706 | S0708 | S0808 |
| 09 | S0901 | S1001 | S1003 | S1203 | S1207 | S1007 | S1005 | S0905 | S0913 | S1013 | S1015 | S1215 | S1211 | S1011 | S1009 | S0909 |
| 10 | S1002 | S0903 | S1201 | S1004 | S1008 | S1205 | S0907 | S1006 | S1014 | S0915 | S1213 | S1016 | S1012 | S1209 | S0911 | S1010 |
| 11 | S1103 | S1202 | S0904 | S1101 | S1105 | S0908 | S1206 | S1107 | S1115 | S1214 | S0916 | S1113 | S1109 | S0912 | S1210 | S1111 |
| 12 | S1204 | S1104 | S1102 | S0902 | S0906 | S1106 | S1108 | S1208 | S1216 | S1116 | S1114 | S0914 | S0910 | S1110 | S1112 | S1212 |
| 13 | S1305 | S1405 | S1407 | S1607 | S1603 | S1403 | S1401 | S1301 | S1309 | S1409 | S1411 | S1611 | S1615 | S1415 | S1413 | S1313 |
| 14 | S1406 | S1307 | S1605 | S1408 | S1404 | S1601 | S1303 | S1402 | S1410 | S1311 | S1609 | S1412 | S1416 | S1613 | S1315 | S1414 |
| 15 | S1507 | S1606 | S1308 | S1505 | S1501 | S1304 | S1602 | S1503 | S1511 | S1610 | S1312 | S1509 | S1513 | S1316 | S1614 | S1515 |
| 16 | S1608 | S1508 | S1506 | S1306 | S1302 | S1502 | S1504 | S1604 | S1612 | S1512 | S1510 | S1310 | S1314 | S1514 | S1516 | S1616 |

FIG.13
Prior Art
(A)
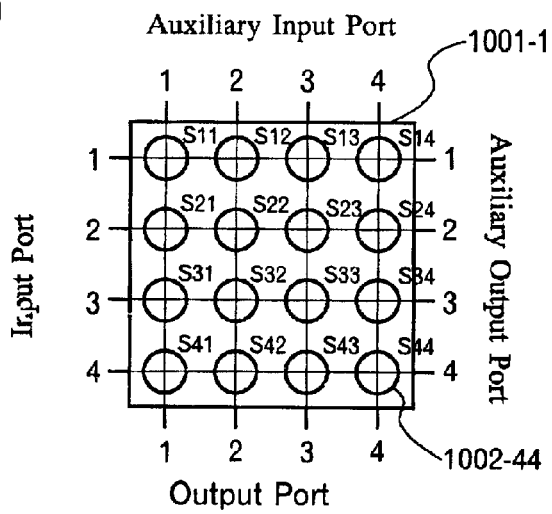
(B)
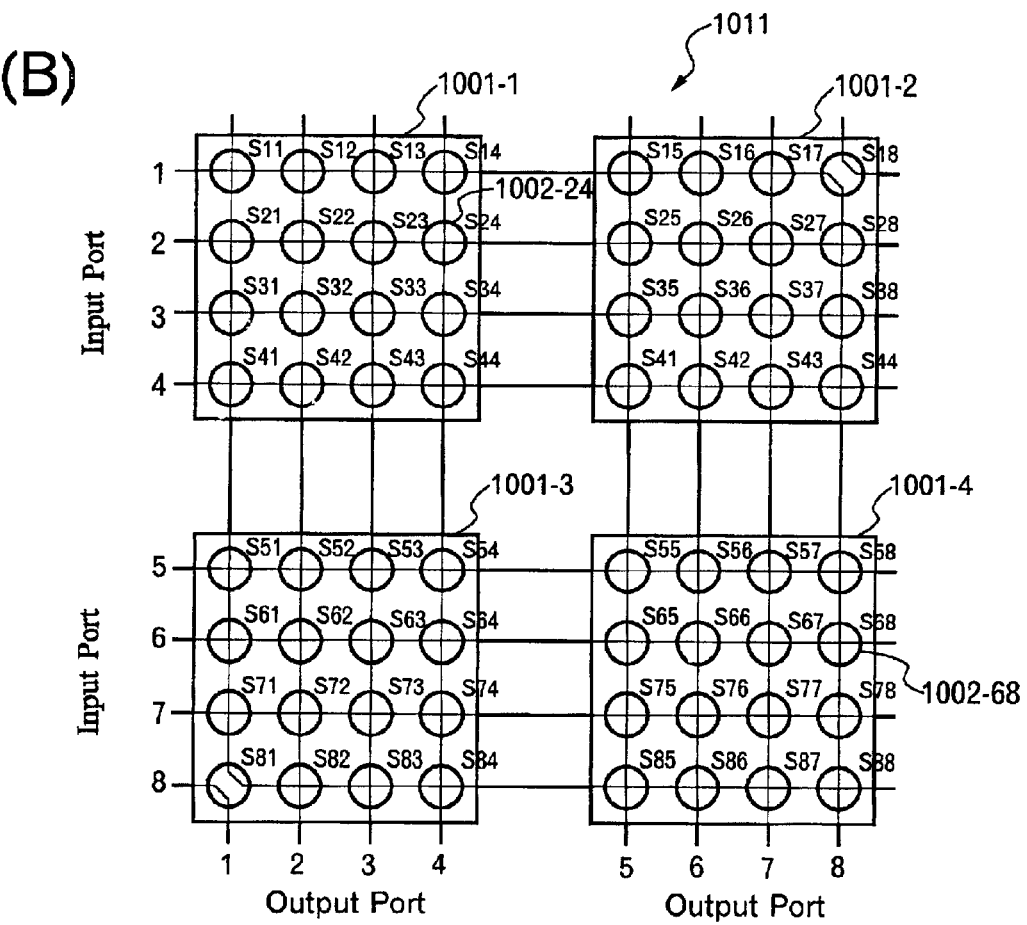

OPTICAL SWITCH EXPANDING METHOD, OPTICAL SWITCH, AND OPTICAL CROSSCONNECTING APPARATUS

BACKGROUND OF THE INVENTION

1. Field of the Invention

The present invention relates to an optical switch. In particular, the invention relates to an optical switch expanding method which enables reduction in optical loss as well as to an optical switch formed based on such an expanding method. The invention also relates to an optical crossconnecting apparatus having such an optical switch.

2. Description of the Related Art

In recent years, multimedia communications as the Internet have spread rapidly. In the field of communications technologies, to cope with sharp increase in traffic due to such rapid spread of multimedia communications, intensive studies and developments have been made of optical communication technologies that enable ultra-long distance communication and large capacity communication. To accommodate further increase in traffic, there has been studied increasing the speed of the time-division multiplexing (TDM) transmission and the degree of multiplexing of the wavelength-division multiplexing (WDM) transmission. In optical crossconnecting apparatus, it is necessary to increase the numbers of inputs and outputs accordingly. It is desired to provide a proper method for expanding optical switches that are the core device of optical crossconnecting apparatus.

An optical crossconnecting apparatus accommodates a plurality of input and output optical transmission lines and routes, on a wavelength basis, a WDM optical signal input to an input optical transmission line, to desired output optical transmission lines. Since such routing is performed by an optical switch, expansion of the input/output ports in the optical switch is required for expanding (increasing the numbers of) the input/output ports in an optical crossconnecting apparatus.

FIGS. 13A and 13B are for explaining a conventional optical switch expanding method. FIG. 13A shows a 4×4 optical matrix switch before expansion and FIG. 13B shows an 8×8 optical matrix switch after expansion.

As shown in FIGS. 13A and 13B, the 4×4 optical matrix switch 1001 is configured in such a manner that sixteen 2×2 optical switch elements 1002 are arranged in a 4-row/4-column matrix. Such an n×n optical switch (n: integer) in a matrix will particularly be called an n×n optical matrix switch and a 2×2 optical switch that is a minimum unit of the n×n optical matrix switch will be called a 2×2 optical switch element.

Conventionally, in expanding such a 4-input/4-output 4×4 optical matrix switch 1001-1 to an 8-input/8-output 8×8 optical matrix switch 1011 in terms of the input/output ports, three optical matrix switches 1001-2 to 1001-4 are provided additionally, the four optical matrix switches 1001-1 to 1001-4 are arranged in a matrix, and the input ports and the output ports in two of the optical matrix switches 1001-1 to 1001-4 that are adjacent to each other vertically or horizontally are connected to each other.

The optical switch elements 1002 of the 8×8 optical matrix switch 1011 are assigned row numbers in order of the first input port to the eighth input port and assigned column numbers in order of geometrical closeness to the input ports. The row numbers and the column numbers assigned are given to the optical switch elements 1002 as suffixes each being an array of a row number and a column number that are arranged in this order. For example, in FIG. 13B, the optical switch element that is connected to the second input port and located fourth as counted from the input port is the second-row/fourth-column optical switch element and hence is given a reference symbol 1002-24. The optical switch element that is connected to the sixth input port and located eighth as counted from the input port is the sixth-row/eighth-column optical switch element and hence is given a reference symbol 1002-68. To avoid unduly complicating FIG. 13B, only part of the reference symbols of the optical switch elements 1002 are drawn in the figure.

For the sixty-four optical switch elements 1002, control symbols to be used for a control of routing an optical signal that is input to the optical matrix switch 1011 to a desired output port are assigned in the following manner. They are assigned so as to specify, by using an input port position and an output port position, an optical switch element 1002 where switching should be made for routing to a desired output port. In FIG. 13B, each of such control symbols is an array of S, an input port number, and an output port number that are arranged in this order. For example, the optical switch element 1002-11 is given a symbol S11. An optical signal that is input to the first input port can be routed to the first output port by switching at the optical switch element 1002-11 (S11). The optical switch element 1002-75 is given a symbol S75. An optical signal that is input to the seventh input port can be routed to the fifth output port by switching at the optical switch element 1002-75 (S75).

In the optical matrix switch 1011 obtained by expanding the 4-input/4-output optical matrix switch 1001 in the above method, an optical signal passes through fifteen optical switch elements at maximum, in which optical loss is large. For example, to output, from the eighth output port, an optical signal that is input to the first input port, switching is performed at the optical switch element 1002-18 (S18). Therefore, the optical signal passes through the fifteen optical switch elements 1002-11, 1002-12, 1002-13, 1002-14, 1002-15, 1002-16, 1002-17, 1002-18, 1002-28, 1002-38, 1002-44, 1002-58, 1002-68, 1002-78, and 1002-88. Losses in those optical switch elements 1002 sum up to a large loss.

On the other hand, an optical that is input to the eighth input port can be routed to the first output port by switching only at the optical switch element 1002-81 (S81). This optical signal passes through only one optical switch element 1002-81.

As a result, a difference approximately corresponding to the losses in 14 optical switch elements 1002 occurs between the optical output level of the optical signal that has passed through the one optical switch element 1002 and that of the optical signal that has passed through the 15 optical switch elements 1002.

Incidentally, since an optical signal that is output from an optical matrix switch is input to an optical component such as a photodetector of an optical receiver, its optical output level should be higher than a certain level. However, loss occurs in each optical switch element. Therefore, where routing is performed by an optical matrix switch, the maximum number of optical switch elements through which an optical signal passes determines a switch size (i.e., the numbers of inputs and outputs) of the optical matrix switch. Therefore, the conventional expanding method and optical matrix switches according to the conventional expanding method have a problem that the matrix optical switch cannot be large in size because as the degree of expansion increases, the maximum number of optical switch elements through which an optical signal passes increases and the loss rises accordingly.

Large differences between the output levels of the respective output ports in an optical matrix switch cause a problem that optical components connected to the output ports such as optical amplifiers or photodetectors should have a wide input dynamic range or plural kinds of optical components having different input dynamic ranges should be prepared.

SUMMARY OF THE INVENTION

An object of the present invention is therefore to provide an optical switch expanding method which enables expansion of an optical switch with a smaller loss than in the conventional art, as well as an optical switch in which connections are made according to the expanding method and an optical crossconnecting apparatus where the optical switch is employed.

Another object of the invention is to provide an optical switch expanding method which enables expansion of an optical switch with smaller differences between the levels of output light than in the conventional art, as well as an optical switch in which connections are made according to the expanding method and an optical crossconnecting apparatus where the optical switch is employed.

The invention provides an optical switch expanding method for increasing the number of inputs and outputs of an optical switch comprising first to fourth optical matrix switches in which a plurality of 2-input/2-output optical switch elements are arranged in a matrix to form a plurality of input ports, a plurality of auxiliary input ports, a plurality of output ports, and a plurality of auxiliary output ports.

The optical switch expanding method comprises the steps of: respectively connecting the auxiliary output ports in the first optical matrix switch to the input ports in the third optical matrix switch; respectively connecting the output ports in the second optical matrix switch to the auxiliary input ports in the third optical matrix switch; respectively connecting the output ports in the first optical matrix switch to the auxiliary input ports in the fourth optical matrix switch; and respectively connecting the auxiliary output ports in the second optical matrix switch to the input ports in the fourth optical matrix switch.

The invention also provides an optical switch comprising first to fourth optical matrix switches wherein a plurality of 2-input/2-output optical switch elements are arranged in a matrix to form a plurality of input ports, a plurality of auxiliary input ports, a plurality of output ports, and a plurality of auxiliary output ports. The auxiliary output ports in the first optical matrix switch are respectively connected to the input ports in the third optical matrix switch, the output ports in the second optical matrix switch are respectively connected to the auxiliary input ports in the third optical matrix switch, the output ports in the first optical matrix switch are respectively connected to the auxiliary input ports in the fourth optical matrix switch, and the auxiliary output ports in the second optical matrix switch are respectively connected to the input ports in the fourth optical matrix switch.

Each of the first to fourth optical matrix switches may be a Cross-bar optical matrix switch.

The 2-input/2-output optical switch elements may be semiconductor optical switches.

The 2-input/2-output optical switch elements may be optical switches in an optomicro-electromechanical system.

Each of the first to fourth optical matrix switches may be a PI-LOSS optical matrix switch.

The invention further provides an optical crossconnecting apparatus comprising: a plurality of optical demultiplexing sections for demultiplexing, on a wavelength basis, input light to be output from a plurality of output ports; a plurality of optical multiplexing sections for wavelength-multiplexing optical signals that are input to a plurality of input ports; and an optical switch comprising first to fourth optical matrix switches wherein a plurality of 2-input/2-output optical switch elements are arranged in a matrix to form a plurality of input ports, a plurality of auxiliary input ports, a plurality of output ports, and a plurality of auxiliary output ports. The auxiliary output ports in the first optical matrix switch are respectively connected to the input ports in the third optical matrix switch, the output ports in the second optical matrix switch are respectively connected to the auxiliary input ports in the third optical matrix switch, the output ports in the first optical matrix switch are respectively connected to the auxiliary input ports in the fourth optical matrix switch, and the auxiliary output ports in the second optical matrix switch are respectively connected to the input ports in the fourth optical matrix switch.

In the optical crossconnecting apparatus (optical matrix switch) according to the invention, it is possible to reduce optical loss and differences between the levels of output light of the respective output, compared to the conventional art. Therefore, the input dynamic range of optical components that are connected to the output ports in the optical crossconnecting apparatus (optical matrix switch) can be reduced.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

In the accompanying drawings:

FIG. 3 shows a control symbol correspondence table of the optical crossconnecting apparatus (Cross-bar switch type) according to the first embodiment;

FIG. 5 shows a control symbol correspondence table of the optical crossconnecting apparatus (PI-LOSS switch type) according to the modification of the first embodiment;

FIG. 11 shows a control symbol correspondence table of the optical crossconnecting apparatus (Cross-bar switch type) according to the second embodiment;

FIG. 12 shows a control symbol correspondence table of an optical crossconnecting apparatus (PI-LOSS switch type) according to a modification of the second embodiment; and FIGS. 13A and 13B show a conventional optical switch expanding method.

DESCRIPTION OF THE PREFERRED EMBODIMENTS

Principle of the Invention

Figure 1:
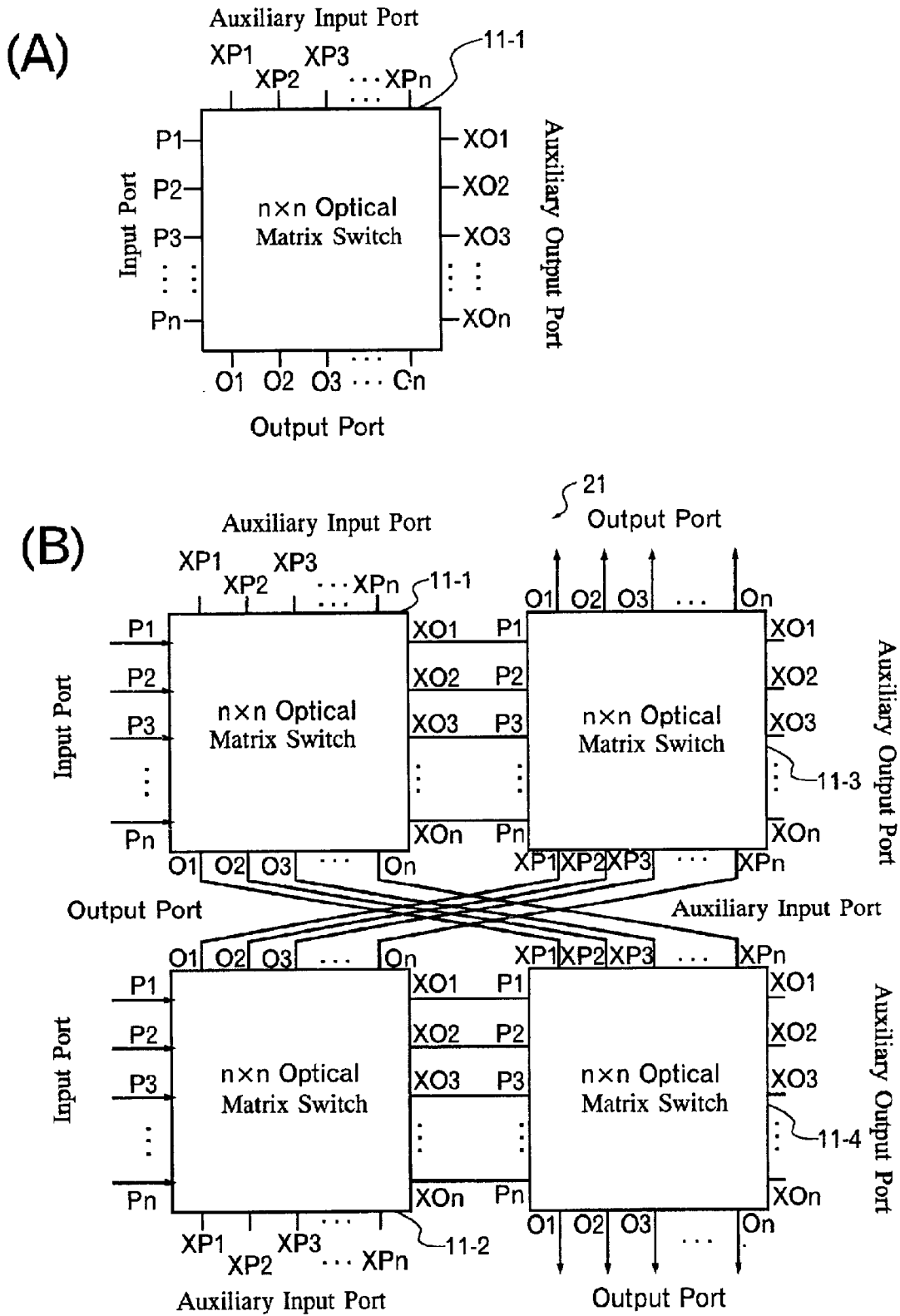
FIGS. 1A and 1B show the principle of the present invention.

FIGS. 1A and 1B show the principle of the present invention.

As shown in FIGS. 1A and 1B, the above objects are attained by an optical switch comprising first to fourth optical matrix switches 11-1 to 11-4 in each of which a plurality of 2-input/2-output optical switch elements are arranged in a matrix and a plurality of input ports P, a plurality of auxiliary input ports XP, a plurality of output ports O, and a plurality of auxiliary output ports XO are formed, wherein the auxiliary output ports XO in the first optical matrix switch 11-1 are connected to the respective input ports P of the third optical matrix switch 11-3, the output ports O in the second optical matrix switch 11-2 are connected to the respective auxiliary input ports XP in the third optical matrix switch 11-3, the output ports O in the first optical matrix switch 11-1 are connected to the respective auxiliary input ports XP in the fourth optical matrix switch 11-4, and the auxiliary output ports XO in the second optical matrix switch 11-2 are connected to the respective input ports P in the fourth optical matrix switch 11-4.

The optical matrix switches 11 may be Cross-bar optical switches, PI-LOSS optical switches, or the like. The optical switch elements may be waveguide optical switches, semiconductor optical switches, opto-micro-electromechanical system optical switches, or the like.

In routing by a 2n×2n optical matrix switch in which four n×n optical matrix switches 11 are connected to each other according to the conventional method, an optical signal passes through three n×n optical matrix switches 11 at maximum and one n×n optical matrix switch at minimum. In contrast, in the 2n×2n optical matrix switch 21 in which connections are made according to the above expanding method, an optical signal always passes through two n×n optical matrix switches. Therefore, the loss can be reduced compared to the conventional art. Further, the differences between the output optical levels of the output ports can be smaller than in the conventional art.

An optical crossconnecting apparatus can be configured in such a manner that a plurality of output ports in a plurality of optical demultiplexing sections each of which demultiplexes input light into optical signals having respective wavelengths are connected to the input ports in the 2n×2n optical matrix switch 21, and that a plurality of input ports in a plurality of optical multiplexing sections each of which wavelength-multiplexes optical signals that are input from a plurality of input ports are connected to the output ports in the 2n×2n optical matrix switch 21.

Next, embodiments of the invention will be described with reference to the accompanying drawings. The same components are given the same reference symbols in the drawings and descriptions therefor may be omitted.

Embodiment 1

Configuration

A first embodiment of the invention is directed to an optical crossconnecting apparatus.

Figure 2:
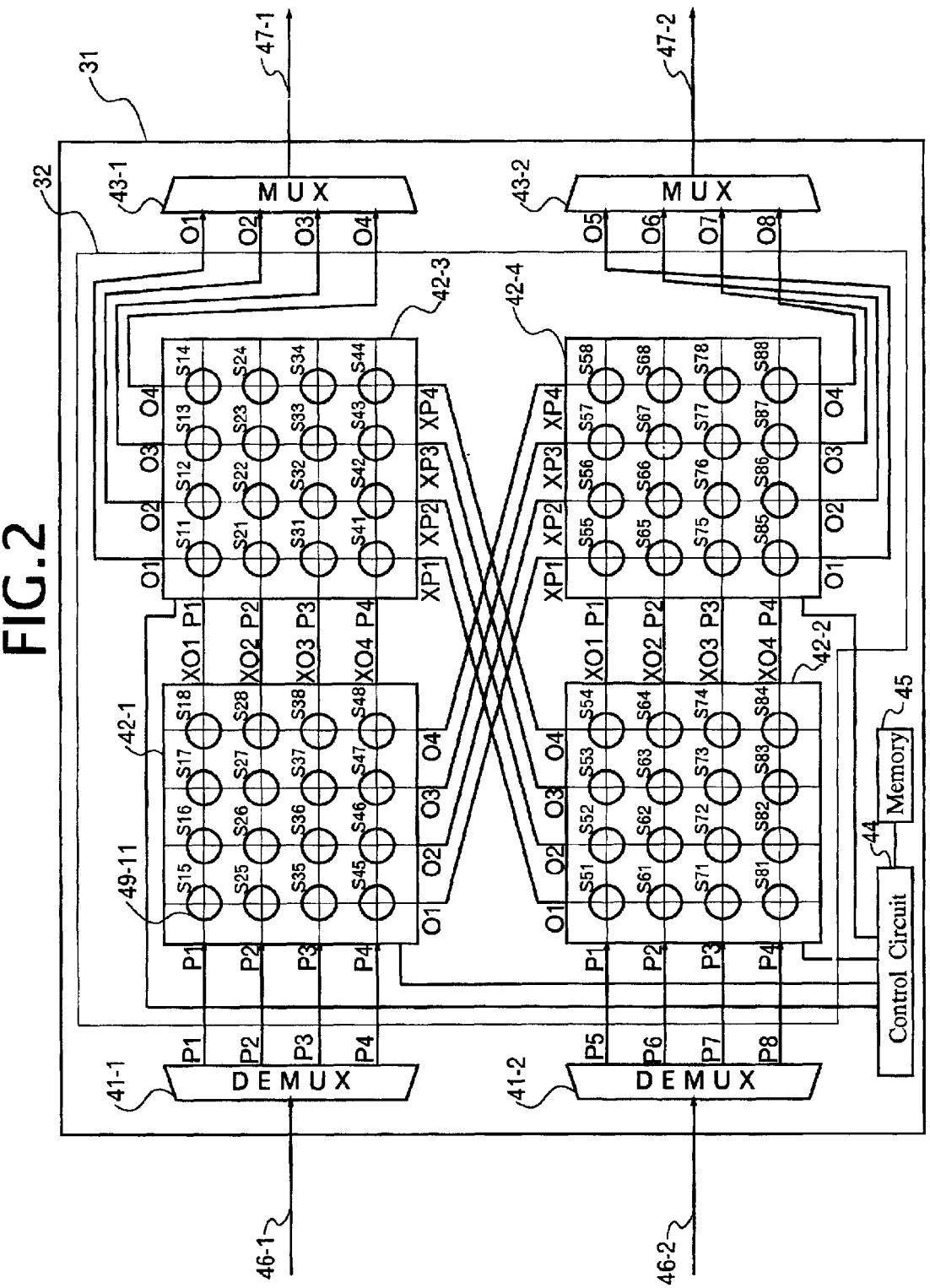
FIG. 2 shows the configuration of an optical crossconnecting apparatus (Cross-bar switch type) according to a first embodiment of the invention.

FIG. 2 shows the configuration of an optical crossconnecting apparatus (Cross-bar switch type) according to the first embodiment. FIG. 3 shows a control symbol correspondence table of the optical crossconnecting apparatus (Cross-bar switch type) according to the first embodiment.

As shown in FIG. 2, the optical crossconnecting apparatus 31 is composed of optical demultiplexers (hereinafter to be referred to as DEMUX) 41-1 and 41-2, an 8×8 optical matrix switch 32, optical multiplexers (hereinafter to be referred to as MUX) 43-1 and 43-2, a control circuit 44, and a memory 45.

Each DEMUX 41 is a passive optical component for outputting a plurality of optical signals having different wavelengths constituting input light, to a plurality of output ports in accordance with the wavelengths. In this embodiment, each DEMUX 41 has first to fourth output ports. An optical transmission line 46-1 is connected to the input port of the DEMUX 41-1, and an optical transmission line 46-2 is connected to the input port of the DEMUX 41-2. The first to fourth output ports in the DEMUX 41-1 are respectively connected to the first to fourth input ports in the optical matrix switch 32. The first to fourth output ports in the DEMUX 41-2 are connected, one to one, to the fifth to eighth input ports in the optical matrix switch 32.

The 8×8 optical matrix switch 32 is an 8-input/8-output optical exchange switch and is composed of the four (first to fourth) 4×4 optical matrix switches 42.

Each optical matrix switch 42 is a 4-input/4-output Cross-bar switch and is formed by arranging sixteen 2×2 optical switch elements 49 in a 4-row/4-column matrix. Since the 2×2 optical switch elements 49 are arranged in a matrix, if the optical switch elements located on two sides of the matrix are allocated to input ports and output ports, input-possible ports and output-possible ports remain so as to be associated with the optical switch elements located on the other two sides. Those input-possible ports and output-possible ports can be used as auxiliary input ports and auxiliary output ports. Each optical switch element 49 has a cross state that an input terminal a is connected to an output terminal d and an input terminal b is connected to an output terminal c and a bar state that the input terminal a is connected to the output terminal c and the input terminal b is connected to the output terminal d. Having those two states, each optical switch element 49 can switch optical paths.

The optical switch elements 49 may be mechanical optical switches, optical waveguide switches, or the like.

The mechanical optical switch is an optical component that switches optical paths by moving or rotating an optical fiber itself or a minute optical element such as a prism, a rod lens, a mirror, or the like. Recently, opto-micro-electromechanical system optical switches have been developed in which an index matching liquid that is sealed between optical waveguides by using a semiconductor microprocessing technology is moved mechanically or a mirror is moved by an electrostatic actuator.

The optical waveguide switch is an optical component for switching optical paths by, for example, forming a Mach-Zehnder interferometer by using optical waveguides and applying electric fields to the respective optical waveguide arm to change the refractive indices thereof. Where the refractive indices of the optical waveguide arms are changed according to the thermo-optic effect, quartz-type optical waveguides formed on a silicon substrate are used. Where the refractive indices of the optical waveguide arms are changed according to the electro-optical effect, titanium-type optical waveguides formed on a lithium niobate (ferroelectric material) are used. Also known are a semiconductor switch where a refractive index variation due to carrier injection is utilized and a branching/joining-type semiconductor optical switch where a semiconductor optical switch or an optical amplifier is used as an on/off gate.

The first to fourth input ports P1–P4 in the first optical matrix switch 42-1 are respectively connected to the output ports in the DEMUX 41-1 as the first to fourth input ports in the optical matrix switch 32. The first to fourth output ports O1–O4 in the first optical matrix switch 42-1 are respectively connected to the first to fourth auxiliary input ports XP1–XP4 in the fourth optical matrix switch 42-4. That is, the first output port O1 of the first optical matrix switch 42-1 is connected to the first auxiliary input port XP1 of the fourth optical matrix switch 42-4. The second output port O2 of the first optical matrix switch 42-1 is connected to the second auxiliary input port XP2 of the fourth optical matrix switch 42-4. The third output port O3 of the first optical matrix switch 42-1 is connected to the third auxiliary input port XP3 of the fourth optical matrix switch 42-4. The fourth output port O4 of the first optical matrix switch 42-1 is connected to the fourth auxiliary input port XP4 of the fourth optical matrix switch 42-4. The first to fourth auxiliary output ports XO1–XO4 in the first optical matrix switch 42-1 are respectively connected to the first to fourth input ports P1–P4 in the third optical matrix switch 42-3. That is, the first auxiliary output port XO1 in the first optical matrix switch 42-1 is connected to the first input port P1 in the third optical matrix switch 42-3. The second auxiliary output port XO2 in the first optical matrix switch 42-1 is connected to the second input port P2 in the third optical matrix switch 42-3. The third auxiliary output port XO3 in the first optical matrix switch 42-1 is connected to the third input port P3 in the third optical matrix switch 42-3. The fourth auxiliary output port XO4 in the first optical matrix switch 42-1 is connected to the fourth input port P4 in the third optical matrix switch 42-3.

On the other hand, the first to fourth input ports P1–P4 in the second optical matrix switch 42-2 are respectively connected to the output ports in the DEMUX 41-2 as the fifth to eighth input ports in the optical matrix switch 32. The first to fourth output ports O1–O4 in the second optical matrix switch 42-2 are respectively connected to the first to fourth auxiliary input ports XP1–XP4 in the third optical matrix switch 42-3. That is, the first output port O1 in the second optical matrix switch 42-2 is connected to the first auxiliary input port XP1 in the third optical matrix switch 42-3. The second output port O2 in the second optical matrix switch 42-2 is connected to the second auxiliary input port XP2 in the third optical matrix switch 42-3. The third output port O3 in the second optical matrix switch 42-2 is connected to the third auxiliary input port XP3 in the third optical matrix switch 42-3. The fourth output port O4 in the second optical matrix switch 42-2 is connected to the fourth auxiliary input port XP4 in the third optical matrix switch 42-3. The first to fourth auxiliary output ports XO1–XO4 in the second optical matrix switch 42-2 are respectively connected to the first to fourth input ports P1–P4 in the fourth optical matrix switch 42-4. That is, the first auxiliary output port XO1 in the second optical matrix switch 42-2 is connected to the first input port P1 in the fourth optical matrix switch 42-4. The second auxiliary output port XO2 in the second optical matrix switch 42-2 is connected to the second input port P2 in the fourth optical matrix switch 42-4. The third auxiliary output port XO3 in the second optical matrix switch 42-2 is connected to the third input port P3 in the fourth optical matrix switch 42-4. The fourth auxiliary output port XO4 in the second optical matrix switch 42-2 is connected to the fourth input port P4 in the fourth optical matrix switch 42-4.

For example, the four optical matrix switches 42-1, 42-2, 42-3, and 42-4 are connected to each other by using optical fibers or an optical waveguide substrate in which optical waveguides are formed on a substrate.

The first to fourth output ports O1–O4 in the third optical matrix switch 42-3 are connected to the respective input ports in the MUX 43-1 as the first to fourth output ports in the optical matrix switch 32.

The first to fourth output ports O1–O4 in the fourth optical matrix switch 42-4 are connected to the respective input ports in the MUX 43-2 as the fifth to eighth output ports in the optical matrix switch 32.

The optical matrix switch 32 having the above connections is an 8-input/8-output optical switch obtained by expanding a 4-input/4-output optical matrix switch 42.

Each MUX 43 is a passive optical component that receives optical signals having different wavelengths at a plurality of input ports and outputs those from a single output port. In this embodiment, each MUX 43 has the first to fourth input ports. As described above, the respective input ports in the MUX 43-1 are connected to the first to fourth output ports in the optical matrix switch 32 (i.e., the first to fourth output ports in the third optical matrix switch 42-3) and the output ports in the MUX 43-1 are connected to an optical transmission line 47-1. The respective input ports in the MUX 43-2 are connected to the fifth to eighth output ports in the optical matrix switch 32 (i.e., the first to fourth output ports in the fourth optical matrix switch 42-4), and the output ports in the MUX 43-2 are connected to an optical transmission line 47-2.

Each of the DEMUXs 41 and the MUXs 43 may be a dielectric multilayer film filter that is an interference filter, an arrayed waveguide grating, or the like.

For example, the optical transmission lines 46 and 47 may be optical fibers such as 1.3 $\mu$m band single-mode optical fibers, 1.55 $\mu$m band dispersion-shifted optical fibers, or dispersion-flatted optical fibers.

As shown in FIG. 3, the memory 45 stores an exchange control program, a control symbol correspondence table showing a relationship between the positions of the optical switch elements 49 and the control symbols Sxy, and etc. The position of each optical switch element is represented by its row number and column number. Each control symbol Sxy indicates a relationship between an input port and an output of an optical signal when the optical switch element 49 assigned the control symbol Sxy is switched from a cross state to a bar state. As shown in FIGS. 2 and 3, the optical switch element 49-11, for example, is assigned S15; when the optical switch element 49-11 is switched from a cross state to a bar state, an optical signal that is input to the first input port is output from the fifth output port. The optical switch element 49-53 is assigned S53; when the optical switch element 49-53 is switched from a cross state to a bar state, an optical signal that is input to the fifth input port is output from the third output port.

The control circuit 44 performs an exchange control of outputting an optical signal that has been input to the 8×8 optical matrix switch 32, from a desired output port. The exchange control is performed in such a manner that the control circuit 44 refers to the control symbol correspondence table stored in the memory 45 to select an optical switch element according to the number of the input ports where an optical signal has been input, and routing information of the optical signal, and switch the selected optical switch element 49 from a cross state to a bar state.

Operation and Advantages

Next, the operation and advantages of the optical crossconnecting apparatus 31 will be described.

The optical crossconnecting apparatus 31 can route an optical signal traveling through the optical transmission line 46-1 to the optical transmission line 47-1 or 47-2, and can route an optical signal being transmitted through the optical transmission line 46-2 to the optical transmission line 47-1 or 47-2. In the routing, the control circuit 44 refers to the control symbol correspondence table stored in the memory 45 to control selection of an optical switch element 49 where switching should be made, and switch the selected optical switch element 49 from a cross state to a bar state.

A description will be made of an example where the optical signal λ2 of a WDM optical signal in which four optical signals λ1-λ4 having different wavelengths are wavelength-multiplexed, is input to the second input port from the optical transmission line 46-1 and is output from the seventh output port to the optical transmission line 47-2.

The 4-wave WDM optical signal is transmitted through the optical transmission line 46-1, input to the DEMUX 41-1 of the optical crossconnecting apparatus 31, and demultiplexed into four optical signals having the respective wavelengths. Separated optical signals λ1 -λ4 are input to the first to fourth input ports P1–P4 in the optical matrix switch 32, respectively.

The control circuit 44 refers to the control symbol correspondence table stored in the memory 45 to select an optical switch element 49 for connecting the second input port to the seventh output port. Since the optical switch element 49 assigned S27 is the second row/third column optical switch element 49-23, the control circuit 44 switches the optical switch element 49-23 from a cross state to a bar state and thereby connects the second input port to the seventh output port.

The optical signal λ2 that has been input to the second input port is input to the second input port in the first optical matrix switch 42-1, output from the third output port O3 in the first optical matrix switch 42-1 via the optical switch elements 49-21, 49-22, 49-23, 49-33, and 49-43, input to the third auxiliary input port XP3 in the fourth optical matrix switch 42-4, output from the third output port O3 in the fourth optical matrix switch 42-4 via the optical switch elements 49-57, 49-67, 49-77, and 49-87, and output from the seventh output port in the optical matrix switch 32.

The optical signal λ2 that is output from the seventh output port is multiplexed by the MUX 43-2 with optical signals that are output from the other ports O5, O6, and O8 and then sent out to the optical transmission line 47-2.

A description will be made of another example case where an optical signal λ4 is input to the eighth input port from the optical transmission line 46-2 and output from the fourth output port to the optical transmission line 47-1.

A 4-wave WDM optical signal including the optical signal λ4 is transmitted through the optical transmission line 46-2, input to the DEMUX 41-2 of the optical crossconnecting apparatus 31, and demultiplexed into four optical signals having the respective wavelengths. Separated optical signals λ1-λ4 are input to the input ports P5–P8 in the optical matrix switch 32, respectively.

The control circuit 44 refers to the control symbol correspondence table to select the optical switch element 49-84 for connecting the eighth input port to the fourth output port, and switch the optical switch element 49-84 from a cross state to a bar state and thereby connects the eighth input port to the fourth output port.

The optical signal λ8 that has been input to the eighth input port is input to the fourth input port in the second optical matrix switch 42-2, output from the fourth output port O4 in the second optical matrix switch 42-2 via the optical switch elements 49-81, 49-82, 49-83, 49-84, 49-74, 49-64, and 49-54, input to the fourth auxiliary input port XP4 in the third optical matrix switch 42-3, output from the fourth output port O4 in the third optical matrix switch 42-3 via the optical switch elements 49-48, 49-38, 49-28, and 49-18, and output from the fourth output port in the optical matrix switch 32.

The optical signal λ4 that is output from the fourth output port is multiplexed by the MUX 43-1 with optical signals that are output from the other ports O1–O3 and then sent out to the optical transmission line 47-1.

A description will be made of a further example case where optical signals λ1 -λ4 of a 4-wave WDM optical signal and optical signals λ5-λ8 of a 4-wave WDM optical signal travel through the respective optical transmission lines 46-1 and 46-2 and the optical signal λ1 that is input to the first input port is output from the first output port, the second optical signal λ2 that is input to the second input port is output from the second output port, the optical signal λ3 that is input to the third input port is output from the seventh output port, the optical signal λ4 that is input to the fourth input port is output from the eighth output port, the optical signal λ5 that is input to the fifth input port is output from the fifth output port, the optical signal λ6 that is input to the sixth input port is output from the sixth output port, the optical signal λ7 that is input to the seventh input port is output from the third output port, and the optical signal λ8 that is input to the eighth input port is output from the fourth output port.

The control circuit 44 refers to the control symbol correspondence table to switch, from a cross state to a bar state, the optical switch element 49-15 corresponding to S11, the optical switch element 49-26 corresponding to S22, the optical switch element 49-33 corresponding to S37, the optical switch element 49-44 corresponding to S48, the optical switch element 49-55 corresponding to S55, the optical switch element 49-66 corresponding to S66, the optical switch element 49-73 corresponding to S73, the optical switch element 49-84 corresponding to S84, and thereby connects the input ports and the output ports, respectively.

The optical signal λ1 that is input to the first input port is output from the first output port via the optical switch elements 49-11, 49-12, 49-13, 49-14, and 49-15. Similarly, the other input signals λ2-λ8 that are input to the respective input ports are output from the respective output ports via the predetermined optical switch elements 49.

As described above, the 8×8 optical matrix switch 32 according to the first embodiment is a complete non-blocking switch.

If the optical signals of a first WDM optical signal traveling through the optical transmission line 46-1 and the optical signals of a second WDM optical signal traveling through the optical transmission line 46-2 use the same wavelengths, there may occur a case that optical signals having the same wavelength are input to one of the MUXs 43-1 and 43-2. An example is that both of the first and second WDM optical signals use wavelengths λ1-λ4 and the optical signals λ1 of the first and second WDM optical signals are input to one of the MUXs 43-1 and 43-2. In this case, it is preferable to provide a wavelength converter for converting the wavelength of an optical signal between the optical matrix switch 32 and each MUX 32. The wavelength converter may be an optical circuit that converts an optical signal into an electrical signal and further converts the electrical signal into an optical signal by modulating light having a desired wavelength according to the electrical signal, or an optical circuit that converts an optical signal directly to an optical signal having a desired wavelength by four light wave mixing according to a nonlinear optical effect.

In the above optical crossconnecting apparatus 31 (optical matrix switch 32), the number of optical switch elements 49 through which an input optical signal passes when routed to a desired output port, is equal to eleven at maximum and five at minimum.

Therefore, in the optical crossconnecting apparatus 31 (optical matrix switch 32), the loss can be reduced compared to a conventional optical crossconnecting apparatus (optical matrix switch) having the same numbers of inputs and outputs. The difference between the optical output levels of the respective output ports can be small as a value approximately corresponding to loss in six optical switch elements 49. Therefore, the input dynamic range of optical components connected to the respective output ports in the optical crossconnecting apparatus 31 (optical matrix switch 32) can be smaller than in the conventional art.

Modification of Embodiment 1

Figure 4:
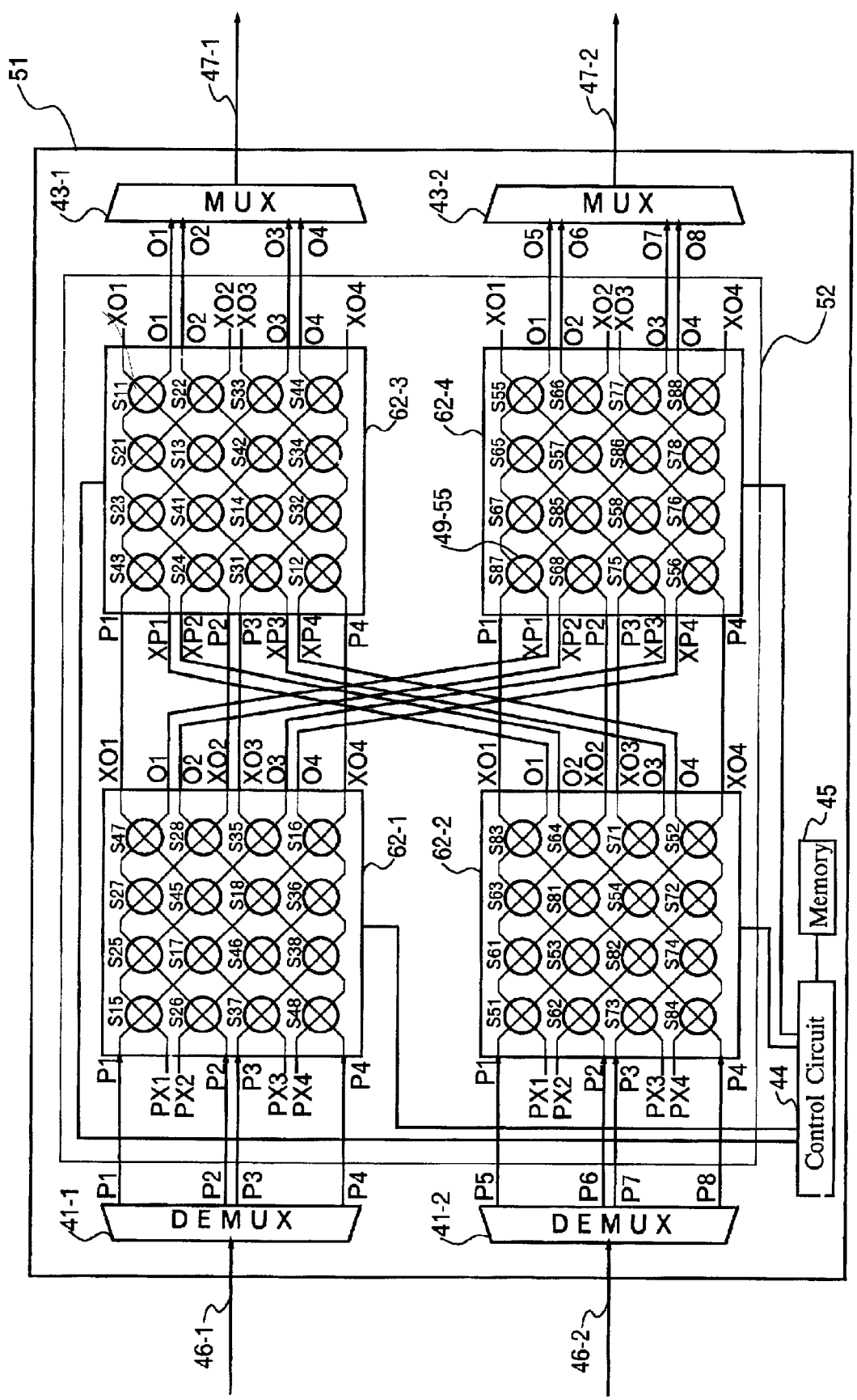
FIG. 4 shows the configuration of an optical crossconnecting apparatus (PI-LOSS switch type) according to a modification of the first embodiment.

FIG. 4 shows the configuration of an optical crossconnecting apparatus (PI-LOSS switch type) according to a modification of the first embodiment. FIG. 5 shows a control symbol correspondence table of the optical crossconnecting apparatus (PI-LOSS switch type) according to the modification of the first embodiment.

As shown in FIG. 4, the modified embodiment is the same in configuration as the first embodiment except that the 4×4 optical matrix switches 42 of the first embodiment are replaced by 4×4 optical matrix switches 62 that are PI-LOSS switches. Therefore, the modified configuration will not be described below in detail. As disclosed in Japanese National Publication No. Sho63-500140 Japanese Examined Patent Application Publication No. Hei6-66982), the PI-LOSS switch is an optical matrix switch in which the number of optical switch elements through which an optical signal passes is the same irrespective of from/to which input port and output port the optical signal is input and output.

Because of the above characteristics of the PI-LOSS switch, in the optical crossconnecting apparatus 51 according to the modification of the first embodiment, the number of optical switch elements 49 through which an input optical signal passes when routed to a desired output port is always equal to eight.

For example, in case of outputting an optical signal λ3 that has been input to the seventh input port, from the second output port, the control circuit 44 refers to the control symbol correspondence table (see FIG. 5) stored in the memory 45 to switch the optical switch element 49-83 corresponding to S72 from a cross state to a bar state, whereby the optical signal λ3 that has been input to the seventh input port and then to the third input port in the second optical matrix switch 62-2 is: output from the fourth output port O4 in the second optical matrix switch 62-2 via the optical switch elements 49-71, 49-82, 49-83, and 49-84; input to the fourth auxiliary input port XP4 in the third optical matrix switch 62-3; output from the second output port in the third optical matrix switch 62-3 via the optical switch elements 49-45, 49-46, 49-37, and 49-28; and output from the second output port in the optical matrix switch 52.

Therefore, in the optical crossconnecting apparatus 51 (optical matrix switch 52), it is possible to reduce loss compared to a conventional optical crossconnecting apparatus (optical matrix switch) having the same numbers of inputs and outputs. Further, since differences between the optical output levels of the respective output ports are almost equal to zero, the input dynamic range of optical components connected to the respective output ports in the optical crossconnecting apparatus 51 (optical matrix switch 52) can be made smaller than in the first embodiment.

Embodiment 2
Configuration

Figure 6:
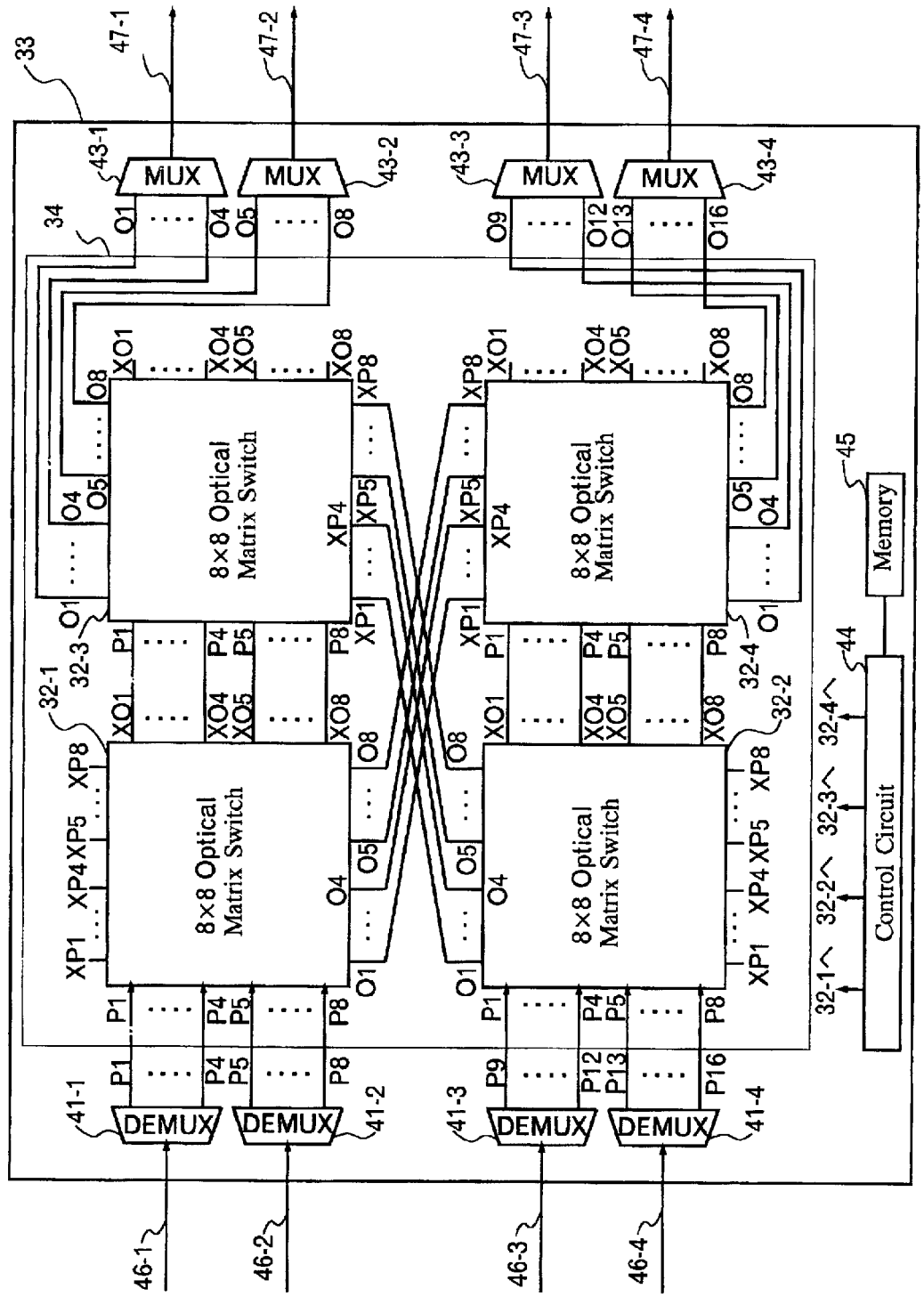
FIG. 6 shows the configuration of an optical crossconnecting apparatus (Cross-bar switch type) according to a second embodiment of the invention.

FIG. 6 shows the configuration of an optical crossconnecting apparatus (Cross-bar switch type) according to a second embodiment. FIGS. 7–10 show the partial configurations of the optical crossconnecting apparatus according to the second embodiment. FIG. 11 shows a control symbol correspondence table of the optical crossconnecting apparatus (Cross-bar switch type) according to the second embodiment.

As shown in FIGS. 6–10, the optical crossconnecting apparatus 33 is composed of DEMUXs 41-1, 41-2, 41-3, and 41-4, a 16×16 optical matrix switch 34, MUXs 43-1, 43-2, 43-3, and 43-4, a control circuit 44, and a memory 45.

In the second embodiment, optical transmission lines 46-1 to 46-4 are connected to the input ports in the DEMUXs 41-1 to 41-4, respectively. The first to fourth output ports in the DEMUX 41-1 are respectively connected to the first to fourth input ports in the optical matrix switch 34. The first to fourth output ports in the DEMUX 41-2 are respectively connected to the fifth to eighth input ports in the optical matrix switch 34. The first to fourth output ports in the DEMUX 41-3 are respectively connected to the ninth to twelfth input ports in the optical matrix switch 34. The first to fourth output ports in the DEMUX 41-4 are respectively connected to the thirteenth to sixteenth input ports in the optical matrix switch 34.

The 16×16 optical matrix switch 34 is a 16-input/16-output optical exchange switch and is composed of four (first to fourth) 8×8 optical matrix switches 32-1, 32-2, 32-3, and 32-4. Each optical matrix switch 32 is the optical exchange switch according to the first embodiment. Therefore, the optical crossconnecting apparatus 33 (optical matrix switch 34) according to the second embodiment is a 16-input/16-output optical crossconnecting apparatus obtained by expanding the 8-input/8-output optical crossconnecting apparatus 31 (optical matrix switch 32) according to the first embodiment.

Figure 7:
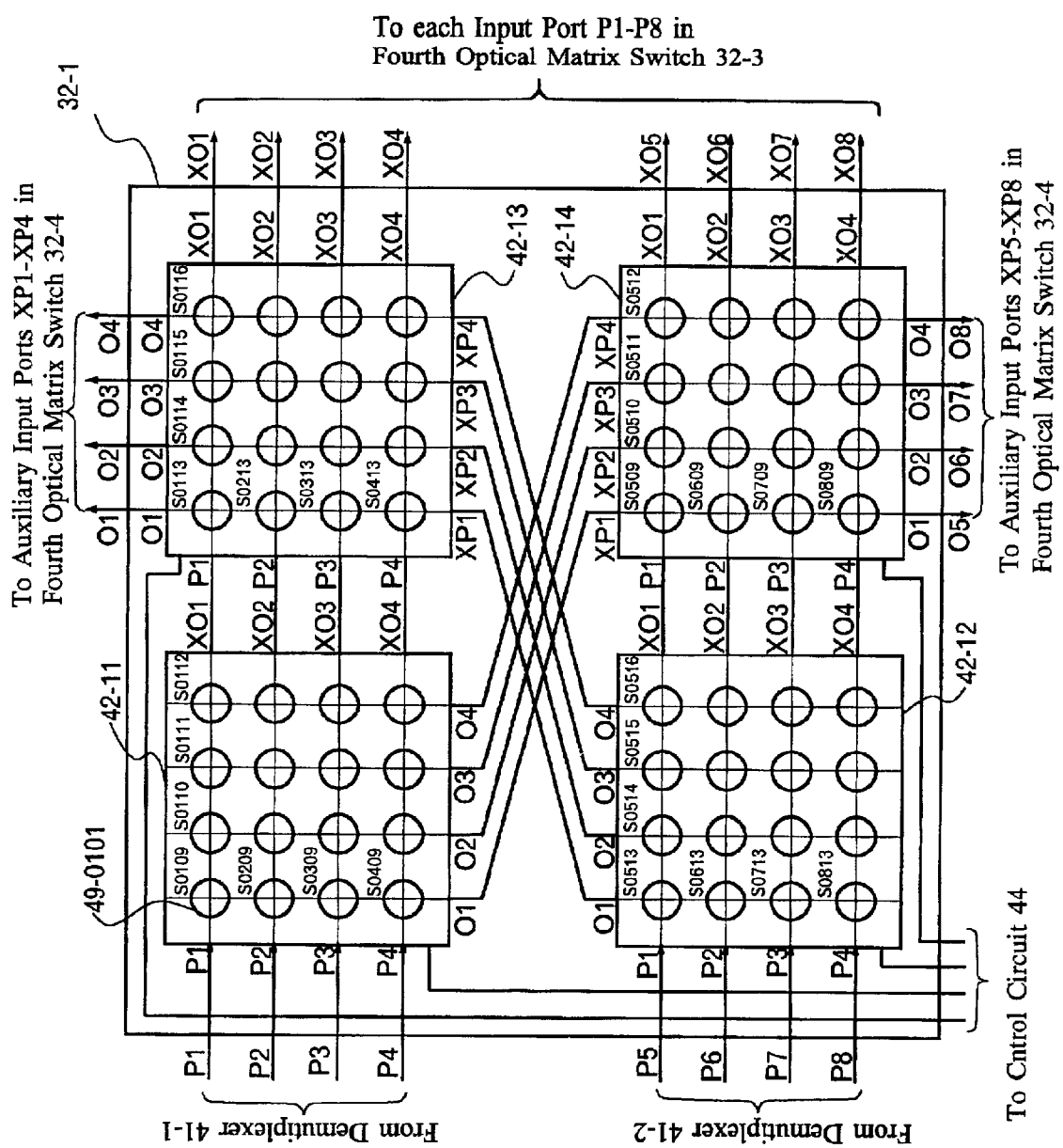
FIGS. 7–10 show the partial configurations of the optical crossconnecting apparatus according to the second embodiment.

As shown in FIGS. 6 and 7, the optical matrix switch 32-1 is composed of four 4×4 optical matrix switches 42-11, 42-12, 42-13, and 42-14 in the same manner as described in the first embodiment. The first to fourth input ports P1–P4 in the optical matrix switch 321 are connected to the first to fourth input ports P1–P4 in the optical matrix switch 42-11, respectively. The fifth to eighth input ports P5–P8 in the optical matrix switch 32-1 are connected to the first to fourth input ports P1–P4 in the optical matrix switch 42-12, respectively. The first to eighth input ports P1–P8 in the optical matrix switch 32-1 are connected to the first to eighth input ports P1–P8 in the optical matrix switch 34, respectively. The connections in each of the four optical matrix switches 42-11, 42-12, 42-13, and 42-14 are the same as described in the first embodiment and hence are not described here. Although in the first embodiment the first to fourth auxiliary output ports XO1–XO4 of each of the optical matrix switches 42-3 and 42-4 are not used, in the second embodiment the first to fourth auxiliary output ports XO1–XO4 in the optical matrix switches 42-13 are used as the first to fourth auxiliary output ports XO1–XO4 in the optical matrix switch 32-1 and the first to fourth auxiliary output ports XO1–XO4 in the optical matrix switches 42-14 are used as the fifth to eighth auxiliary output ports XO5–XO8 in the optical matrix switch 32-1.

Figure 8:
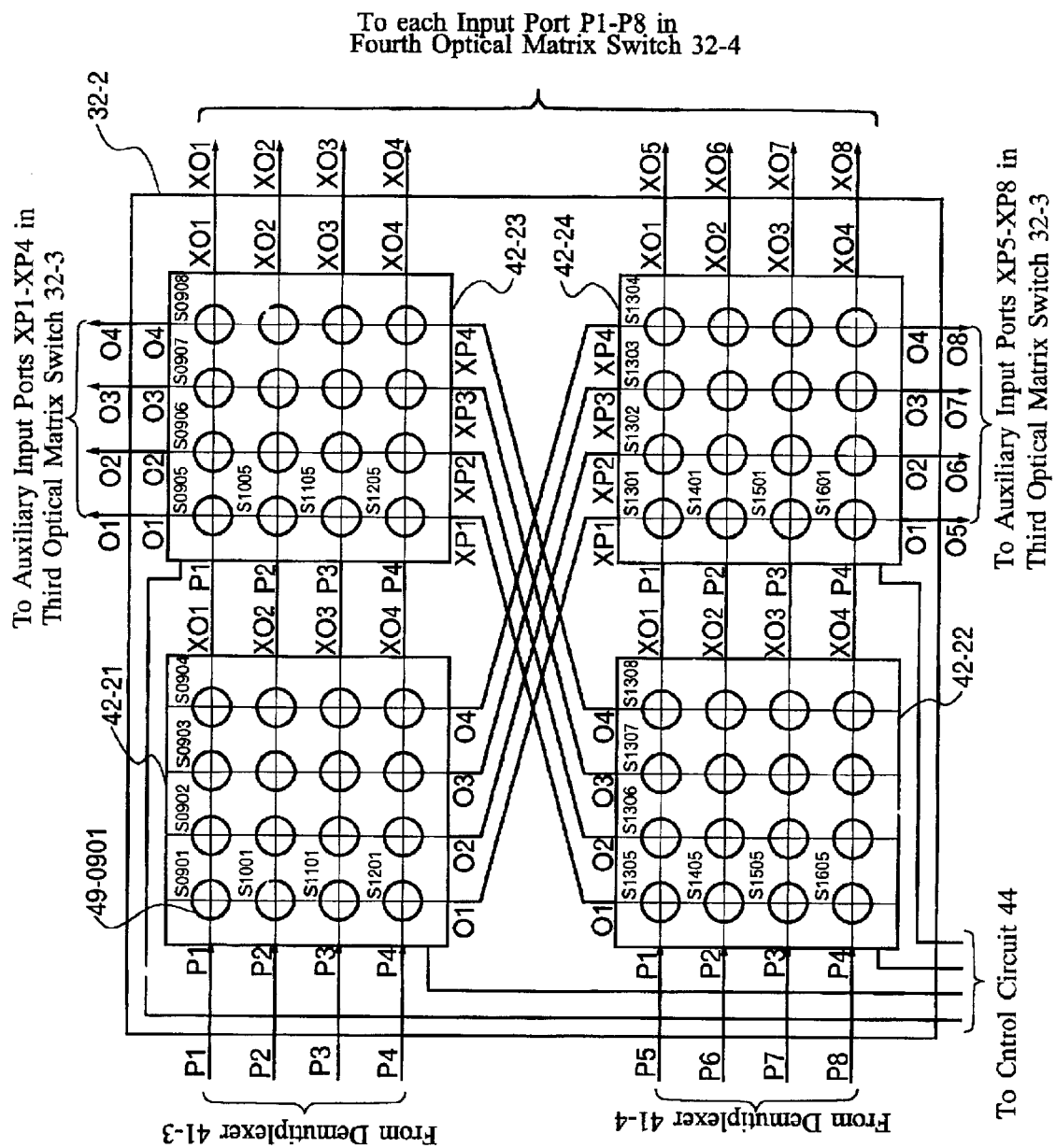

As shown in FIGS. 6 and 8, the optical matrix switch 32-2 is composed of four 4×4 optical matrix switches 42-21, 42-22, 42-23, and 42-24 in the same manner as described in the first embodiment. The first to fourth input ports P1–P4 in the optical matrix switch 322 are connected to the first to fourth input ports P1–P4 in the optical matrix switch 42-21, respectively. The fifth to eighth input ports P5–P8 in the optical matrix switch 32-2 are connected to the first to fourth input ports P1–P4 in the optical matrix switch 42-22, respectively. The first to eighth input ports P1–P8 in the optical matrix switch 32-2 are connected to the ninth to sixteenth input ports P9–P16 in the optical matrix switch 34, respectively. The connections in each in the four optical matrix switches 42-21, 42-22, 42-23, and 42-24 are the same as described in the first embodiment and hence are not described here. Although in the first embodiment the first to fourth auxiliary output ports XO1–XO4 of each of the optical matrix switches 42-3 and 42-4 are not used, in the second embodiment the first to fourth auxiliary output ports XO1–XO4 in the optical matrix switches 42-23 are used as the first to fourth auxiliary output ports XO1–XO4 in the optical matrix switch 32-2 and the first to fourth auxiliary output ports XO1–XO4 in the optical matrix switches 42-24 are used as the fifth to eighth auxiliary output ports XO5–XO8 in the optical matrix switch 32-2.

Figure 9:
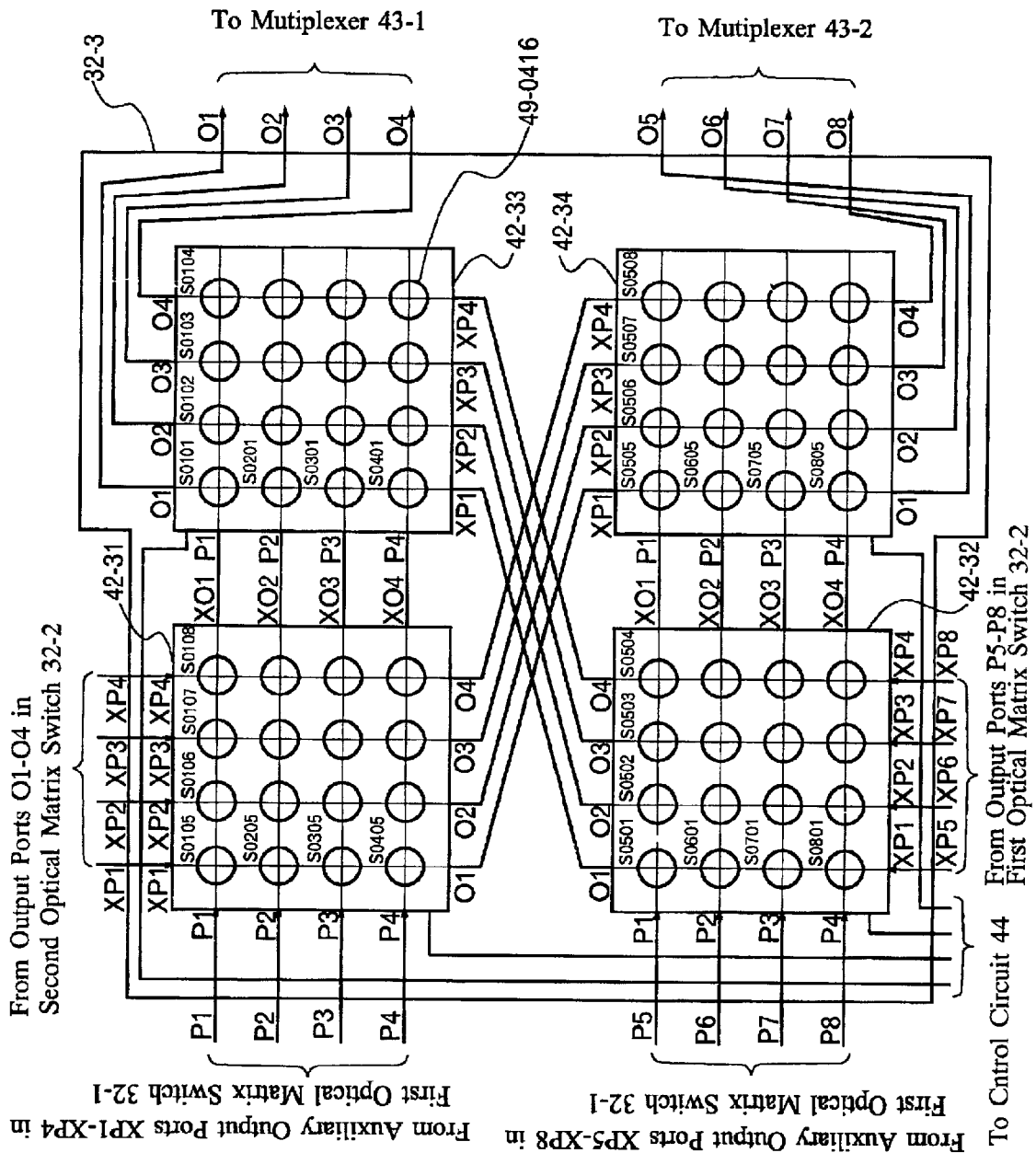

As shown in FIGS. 6 and 9, the optical matrix switch 32-3 is composed of four 4×4 optical matrix switches 42-31, 42-32, 42-33, and 42-34 in the same manner as described in the first embodiment. The first to fourth output ports O1–O4 in the optical matrix switch 42-33 are connected to the first to fourth output ports O1–O4 in the optical matrix switch 32-3, respectively. The first to fourth output ports O1–O4 in the optical matrix switch 4234 are connected to the fifth to eighth output ports O5–O8 in the optical matrix switch 323, respectively. The first to eighth output ports O1–O8 in the optical matrix switch 32-3 are connected to the first to eighth output ports O1–O8 in the optical matrix switch 34, respectively. The connections in each of the four optical matrix switches 42-31, 42-32, 42-33, and 42-34 are the same as described in the first embodiment and hence are not described here. Although in the first embodiment the first to fourth auxiliary input ports XP1–XP4 of each of the optical matrix switches 42-1 and 42-2 are not used, in the second embodiment the first to fourth auxiliary input ports XP1–XP4 in the optical matrix switches 42-31 are used as the first to fourth auxiliary input ports XP1–XP4 in the optical matrix switch 32-3 and the first to fourth auxiliary input ports XP1–XP4 in the optical matrix switches 4232 are used as the fifth to eighth auxiliary input ports XP5–XP8 in the optical matrix switch 32-3.

Figure 10:
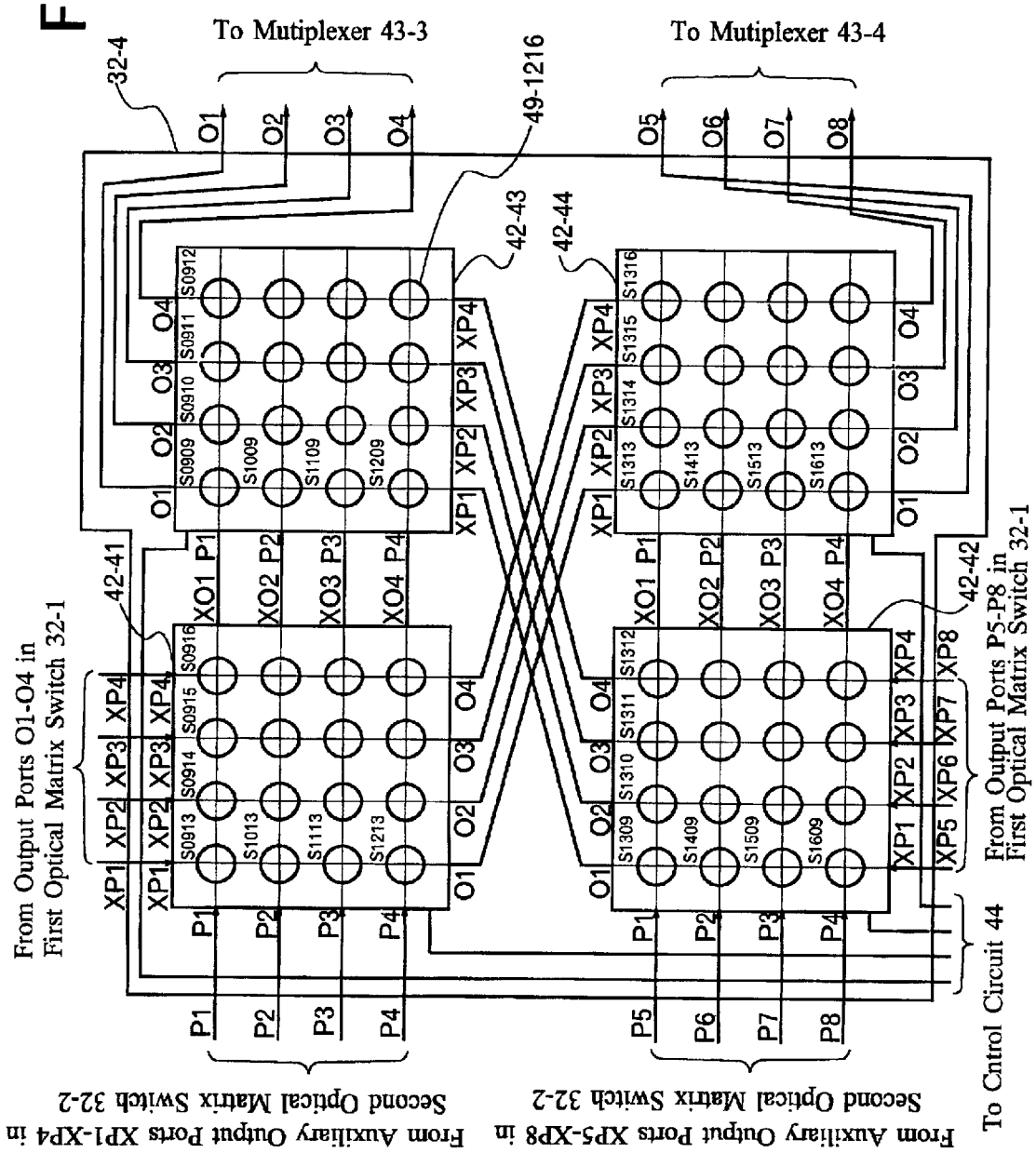

As shown in FIGS. 6 and 10, the optical matrix switch 32-4 is composed of four 4×4 optical matrix switches 42-41, 42-42, 42-43, and 42-44 in the same manner as described in the first embodiment. The first to fourth output ports O1–O4 in the optical matrix switch 42-43 are connected to the first to fourth output ports O1–O4 in the optical matrix switch 32-4, respectively. The first to fourth output ports O1–O4 in the optical matrix switch 42-44 are connected to the fifth to eighth output ports O5–O8 in the optical matrix switch 32-4, respectively. The first to eighth output ports O1–O8 in the optical matrix switch 32-4 are connected to the ninth to sixteenth output ports O9–O16 in the optical matrix switch 34, respectively. The connections in each of the four optical matrix switches 42-41, 42-42, 42-43, and 42-44 are the same as described in the first embodiment and hence are not described here. Although in the first embodiment the first to fourth auxiliary input ports XP1–XP4 of each of the optical matrix switches 42-1 and 42-2 are not used, in the second embodiment the first to fourth auxiliary input ports XP1–XP4 in the optical matrix switches 42-41 are used as the first to fourth auxiliary input ports XP1–XP4 in the optical matrix switch 32-4 and the first to fourth auxiliary input ports XP1–XP4 in the optical matrix switches 42-42 are used as the fifth to eighth auxiliary input ports XP5–XP8 in the optical matrix switch 32-4.

Returning to FIG. 6, the first to eighth output ports O1–O8 in the first optical matrix switch 32-1 are respectively connected to the first to eighth auxiliary input ports XP1–XP8 in the fourth optical matrix switch 32-4. For example, the second output port O2 in the first optical matrix switch 32-1 is connected to the second auxiliary input port XP2 in the fourth optical matrix switch 32-4. The first to eighth auxiliary output ports XO1–XO8 in the first optical matrix switch 32-1 are connected, one to one, to the first to eighth input ports P1–P8 in the third optical matrix switch 32-3, respectively.

The first to eighth output ports O1–O8 in the second optical matrix switch 32-2 are respectively connected to the first to eighth auxiliary input ports XP1–XP8 in the third optical matrix switch 32-3. The first to eighth auxiliary output ports XO1–XO8 in the second optical matrix switch 32-2 are respectively connected to the first to eighth input ports P1–P8 in the fourth optical matrix switch 32-4.

The first to fourth output ports O1–O4 in the third optical matrix switch 32-3 are connected, as the first to fourth output ports O1–O4 in the optical matrix switch 34, to the input ports in the MUX 43-1, respectively. The fifth to eighth output ports O5–O8 in the third optical matrix switch 32-3 are connected, as the fifth to eighth output ports O5–O8 in the optical matrix switch 34, to the input ports in the MUX 43-2, respectively.

The first to fourth output ports O1–O4 in the fourth optical matrix switch 32-4 are connected, as the ninth to twelfth output ports O9–O12 in the optical matrix switch 34, to the input ports in the MUX 43-3, respectively. The fifth to eighth output ports O5–O8 in the fourth optical matrix switch 32-4 are connected, as the 13th to 16th output ports O13–O16 of the optical matrix switch 34, to the input ports in the MUX 43-4, respectively.

The output ports in the MUX 43-1 are connected to the optical transmission line 47-1. The output ports in the MUX 43-2 are connected to the optical transmission line 47-2. The output ports in the MUX 43-3 are connected to the optical transmission line 47-3. The output ports in the MUX 43-4 are connected to the optical transmission line 47-4.

The memory 45 stores the control symbol correspondence table shown in FIG. 11, an exchange control program, etc.

The control circuit 44 refers to the control symbol correspondence table stored in the memory 45 to perform an exchange control of the 16×16 optical matrix switch 34.

Operation and Advantages

Since the optical crossconnecting apparatus 33 according to the second embodiment is an apparatus obtained by expanding the optical crossconnecting apparatus 31 according to the first embodiment, the optical crossconnecting apparatus 33 operates in the same manner as the optical crossconnecting apparatus 31.

That is, the optical crossconnecting apparatus 33 can route an optical signal traveling through an arbitrary one of the optical transmission lines 46-1 to 46-4 to an arbitrary one of the optical transmission lines 47-1 to 47-4. In such routing, the control circuit 44 refers to the control symbol correspondence table stored in the memory 45 to control selection of an optical switch element 49 and switch the selected optical switch element 49 from a cross state to a bar state.

A description will be made of an example case where an optical signal $\lambda 2$ of a 4-wave WDM optical signal traveling through the optical transmission line 46-2 is input to the sixth input port P6, output from the 15th output port O15, and sent out to the optical transmission line 47-4. The control circuit 44 refers to the control symbol correspondence table shown in FIG. 11 stored in the memory 45 to switch the optical switch element 49-0603 corresponding to S0615 from a cross state to a bar state, whereby the optical signal λ2 that has been input to the sixth input port P6 and then to the second input port P2 in the optical matrix switch 42-12 is output from the third output port O3 in the optical matrix switch 42-12 via the optical switch elements 49-0601, 49-0602, 49-0603, and 49-0503; input to the third auxiliary input port XP3 in the optical matrix switch 42-13; output from the third output port O3 in the optical matrix switch 42-13 via the optical switch elements 49-0407, 49-0307, 49-0207, and 49-0107; and output from the third output port O3 in the optical matrix switch 32-1 (See FIGS. 6 and 7). Then, the optical signal λ2 that is output from the third output port O3 in the optical matrix switch 32-1 is input to the third auxiliary input port XP3 in the optical matrix switch 32-4, output from the third output port O3 in the optical matrix switch 42-41 via the optical switch elements 49-0911, 49-1011, 49-1111, and 49-1211, input to the third auxiliary input port XP3 in the optical matrix switch 42-44, output from the third output port O3 in the optical matrix switch 42-44 via the optical switch elements 49-1315, 49-1415, 49-1515, and 49-1615, output from the seventh output port O7 in the optical matrix switch 32-4, and output from the fifteenth output port O15 in the optical matrix switch 34 (see FIGS. 6 and 10).

In the above optical crossconnecting apparatus 33 (optical matrix switch 34), the number of optical switch elements 49 through which an input optical signal passes when routed to a desired output port is equal to nineteen at maximum and thirteen at minimum.

If a 16-input/16-output optical crossconnecting apparatus is formed by 4-inpout/4-output optical matrix switches according to the conventional method, the number of optical switch elements 49 through which an input optical signal passes when routed to a desired output port is equal to thirty-one at maximum and one at minimum.

Therefore, in the optical crossconnecting apparatus 33 (optical matrix switch 34), it is possible to substantially reduce loss compared to the conventional art. The difference between the optical output levels of the respective output ports can be small as a value approximately corresponding to loss in six optical switch elements 49. Therefore, the input dynamic range of optical components connected to the respective output ports in the optical crossconnecting apparatus 34 (optical matrix switch 34) can be made smaller than in the conventional art.

Also in the second embodiment same as in the case of the modified first embodiment, optical matrix switches 52 of PI-LOSS switches are used in place of the optical matrix switches 32. In this case, control symbols may be assigned to the optical switch elements 49 in a manner shown in FIG. 12.

In the modification of the second embodiment where the PI-LOSS switches are used, the number of optical switch elements 49 through which an input optical signal passes when routed to a desired output port is always equal to sixteen due to the characteristics of the PI-LOSS switches,.

Therefore, in such an optical crossconnecting apparatus (optical matrix switch), the loss can be reduced compared to the conventional art. Further, the differences between the optical output levels of the respective output ports are almost equal to zero.

The first and second embodiments and their modifications are directed to the case where the multiplexing number of a WDM optical signal is four. However, the invention is not limited to such a case and can be applied to a case of using a WDM optical signal of any multiplexing number.

The first and second embodiments and their modifications are directed to the case where each of the DEMUXs 41 of the optical crossconnecting apparatus is of the 1-input/4-output type. However, the invention is not limited to such a case and can be applied to a case of using DEMUXs 41 having any number of outputs. The invention can also be applied to a case where a single optical crossconnecting apparatus uses DEMUXs 41 having different numbers of outputs. Similarly, the invention can also be applied to a case of using MUXs 43 having any number of inputs as well as MUXs 43 with different numbers of inputs from each other.

The invention is not limited to the above embodiments and various modifications may be made without departing from the spirit and the scope of the invention. Any improvement may be made in part or all of the components.

What is claimed is:

1. An optical switch expanding method for increasing the number of inputs and outputs of an optical switch comprising first to fourth optical matrix switches, each of the first to fourth optical matrix switches including a plurality of 2-input/2-output optical switch elements arranged in a matrix to form a plurality of input ports, a plurality of auxiliary input ports, a plurality of output ports, and a plurality of auxiliary output ports, comprising:

respectively connecting said auxiliary output ports in the first optical matrix switch to said input ports in the third optical matrix switch;

respectively connecting said output ports in the second optical matrix switch to said auxiliary input ports in the third optical matrix switch;

respectively connecting said output ports in the first optical matrix switch to said auxiliary input ports in the fourth optical matrix switch; and respectively connecting said auxiliary output ports in the second optical matrix switch to said input ports in the fourth optical matrix switch, the first, second, third and fourth optical matrix switches together thereby being a non-blocking optical switch.

2. An optical switch comprising first to fourth optical matrix switches, each of the first to fourth optical matrix switches including a plurality of 2-input/2-output optical switch elements arranged in a matrix to form a plurality of input ports, a plurality of auxiliary input ports, a plurality of output ports, and a plurality of auxiliary output ports, and wherein:

said auxiliary output ports in the first optical matrix switch are respectively connected to said input ports in the third optical matrix switch;

said output ports in the second optical matrix switch are respectively connected to said auxiliary input ports in the third optical matrix switch;

said output ports in the first optical matrix switch are respectively connected to said auxiliary input ports in the fourth optical matrix switch; and said auxiliary output ports in the second optical matrix switch are respectively connected to said input ports in the fourth optical matrix switch, the first, second, third and fourth optical matrix switches together thereby being a non-blocking optical switch.

3. The optical switch according to claim 2, wherein the first to fourth optical matrix switches are Cross-bar optical matrix switches.

4. The optical switch according to claim 2, wherein said 2-input/2-output optical switch elements are semiconductor optical switches.

5. The optical switch according to claim 2, wherein said 2-input/2-output optical switch elements are optical switches in an opto-micro-electromechanical system.

6. The optical switch according to claim 2, wherein the first to fourth optical matrix switches are PI-LOSS optical matrix switches.

7. An optical crossconnecting apparatus comprising:

a plurality of optical demultiplexing means for demultiplexing, on a wavelength basis, input light so as to be output from a plurality of output ports;

a plurality of optical multiplexing means for wavelength-multiplexing light which have been input to a plurality of input ports; and a non-blocking optical switch comprising
first to fourth optical matrix switches, each of the first to fourth optical matrix switches comprising a plurality of 2-input/2-output optical switch elements arranged in a matrix to form a plurality of input ports, a plurality of auxiliary input ports, a plurality of output ports, and a plurality of auxiliary output ports, wherein
said auxiliary output ports in the first optical matrix switch are respectively connected to said input ports in the third optical matrix switch,
said output ports in the second optical matrix switch are respectively connected to said auxiliary input ports in the third optical matrix switch,
said output ports in the first optical matrix switch are respectively connected to said auxiliary input ports in the fourth optical matrix switch,
said auxiliary output ports in the second optical matrix switch are respectively connected to said input ports in the fourth optical matrix switch,
said input ports in said optical switches are connected to a plurality of output ports in said optical demultiplexing means, and
said output ports in said optical switches are connected to a plurality of
input ports in said optical multiplexing means.

8. An optical cross-connecting apparatus comprising:

a plurality of optical demultiplexing units to demultiplex, on a wavelength basis, input light to be output from a plurality of output ports;

a plurality of optical multiplexing units to wavelength-multiplex light input to a plurality of input ports; and a non-blocking optical switch comprising:
first to fourth optical matrix switches, of the first to fourth optical matrix switches comprising a plurality of 2-input/2-output optical switch elements arranged in a matrix to form a plurality of input ports, a plurality of auxiliary input ports, a plurality of output ports, and a plurality of auxiliary output ports, said auxiliary output ports in the first optical matrix switch being respectively connected to said input ports in the third optical matrix switch, said output ports in the second optical matrix switch being respectively connected to said auxiliary input ports in the third optical matrix switch, said output ports in the first optical matrix switch being respectively connected to said auxiliary input ports in the fourth optical matrix switch, said auxiliary output ports in the second optical matrix switch being respectively connected to said input ports in the fourth optical matrix switch, said input ports in said optical switches being connected to a plurality of output ports in said optical demultiplexing units; and said output ports in said optical switches being connected to a plurality of input ports in said optical multiplexing units.

9. An optical switch comprising:

four nxn optical matrix switches, each having at least sixteen 2-input/2-output optical switch elements arranged in a matrix having least four input ports, at least four auxiliary input ports, at least four output ports, and at least four auxiliary output ports, two of the four optical matrix switches together receiving a total of at least sixteen input optical signals, of the at least sixteen input optical signals passing through no more than two of the four nxn optical matrix switches to be output by the other two of the four optical matrix switches, the four nxn optical matrix switches together thereby being a non-blocking optical switch.

10. An apparatus comprising:

four nxn optical matrix switches each including a plurality of input ports, a plurality of auxiliary input ports, a plurality of output ports and a plurality of auxiliary output ports, wherein the input ports, the auxiliary input ports, the output ports and the auxiliary output ports of the four nxn optical matrix switches are connected so that the four nxn optical matrix switches together provide a 2nx2n non-blocking optical switch configured so that an input signal on any of the input ports is switchable to be output from any of the output ports while passing through no more than two of the four nxn optical matrix switches.

11. An apparatus comprising:

four nxn optical matrix switches each including a plurality of input ports, a plurality of auxiliary input ports, a plurality of output ports and a plurality of auxiliary output ports; and means for connecting the input ports, the auxiliary input ports, the output ports and the auxiliary output ports so that the four nxn optical matrix switches together provide a 2nx2n non-blocking optical switch configured so that an input light on any of the input ports is switchable to be output from any of the output ports while passing through no more than two of the four nxn optical matrix switches.

12. An apparatus comprising:

four 4x4 optical matrix switches each including a plurality of input ports, a plurality of auxiliary input ports, a plurality of output ports and a plurality of auxiliary output ports, wherein the input ports, the auxiliary input ports, the output ports, and the auxiliary output ports of the four 4x4 optical matrix switches are connected so that the four 4x4 optical matrix switches together provide an 8x8 non-blocking optical switch configured so that an input light on any of the input ports is switchable to be output from any of the output ports while passing through no more than two of the four 4x4 optical matrix switches.

13. An apparatus comprising:

four 4x4 optical matrix switches each including a plurality of input ports, a plurality of auxiliary input ports, a plurality of output ports and a plurality of auxiliary output ports; and means for connecting the input ports, the auxiliary input ports, the output ports and the auxiliary output ports so that the four 4x4 optical matrix switches together to provide an 8x8 non-blocking optical switch configured so that an input light on any of the input ports is switchable to be output from any of the output ports while passing through no more than two of the four 4x4 optical matrix switches.

* * * * *

UNITED STATES PATENT AND TRADEMARK OFFICE
CERTIFICATE OF CORRECTION

PATENT NO. : 6,792,176 B2
DATED : September 14, 2004
INVENTOR(S) : Tetsuya Nishi et al.

It is certified that error appears in the above-identified patent and that said Letters Patent is hereby corrected as shown below:

Column 17,
Line 44, after "switches," insert -- each --

Column 18,
Line 8, after "signals," insert -- each --

Signed and Sealed this

Eighteenth Day of January, 2005

JON W. DUDAS
*Director of the United States Patent and Trademark Office*